United States Patent [19]

Furuta et al.

[11] 4,213,946

[45] Jul. 22, 1980

[54] PROCESS FOR PREVENTING FORMATION OF GYPSUM SCALE IN A FLUE GAS DESULFURIZATION PROCESS

[75] Inventors: Isao Furuta; Kazuhito Yagaki; Toyohiko Masuda, all of Kobe, Japan

[73] Assignee: Kobe Steel, Ltd., Kobe, Japan

[21] Appl. No.: 861,973

[22] Filed: Dec. 19, 1977

[30] Foreign Application Priority Data

Dec. 21, 1976 [DE] Fed. Rep. of Germany ....... 2657971

[51] Int. Cl.² .............................................. C01B 17/00
[52] U.S. Cl. ..................................... 423/242; 423/166
[58] Field of Search ......................... 423/242, 243, 166

[56] References Cited

U.S. PATENT DOCUMENTS

| | | | |
|---|---|---|---|
| 3,386,798 | 6/1968 | Bevans et al. | 423/242 |
| 3,632,306 | 1/1972 | Villiers-Fisher et al. | 423/243 |
| 3,959,441 | 5/1976 | Furuta et al. | 423/242 |
| 4,080,428 | 3/1978 | Holter et al. | 423/242 |

*Primary Examiner*—Delbert E. Gantz
*Assistant Examiner*—Gregory A. Heller
*Attorney, Agent, or Firm*—Oblon, Fisher, Spivak, McClelland & Maier

[57] ABSTRACT

In a process for preventing the formation of gypsum scale in a flue gas desulfurization process, in which a gas containing $SO_2$ is subjected to a desulfurization treatment by a lime-gypsum process, the concentration of $Ca(OH)_2$ in an absorbing solution is maintained at not more than 0.1% by weight, and the absorbing liquid contains not more than 40% by weight of $CaCl_2$.

3 Claims, No Drawings

PROCESS FOR PREVENTING FORMATION OF GYPSUM SCALE IN A FLUE GAS DESULFURIZATION PROCESS

BACKGROUND OF THE INVENTION

1. Field of the Invention

This invention relates to a process for preventing the formation of gypsum scale in a flue gas desulfurization process.

2. Description of the Prior Art

Hitherto, many processes have been proposed for flue gas desulfurization, in which alkali absorbents such as sodium, potassium, or calcium compounds are used for treating a gas containing $SO_2$. One of the processes, which has found a wide application, is a lime-gypsum process using a calcium system, which uses $Ca(OH)_2$ as an absorbent, because the lime is low in cost, abundant and hence advantageous from an economic viewpoint and also because of the freedom from a secondary public nuisance and the possibility of reuse of gypsum.

According to the lime-gypsum process, an exhaust gas is brought into contact with an absorbing solution containing $Ca(OH)_2$ in a scrubber whereby $SO_2$ contained in the exhaust gas reacts with $Ca(OH)_2$ and is absorbed. According to this reaction, there may be obtained $CaSO_3 \cdot \frac{1}{2}H_2O$, part of which in turn is oxidized so as to give gypsum.

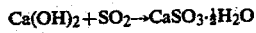

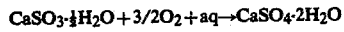

When $Ca(OH)_2$ is present in an excessive amount in the absorbing solution, unreacted $Ca(OH)_2$ remains in the absorbing solution discharged from the scrubber, and is transported into the treatment section. This leads to a loss of the alkali.

For preventing the loss of the alkali, it is mandatory to eliminate $Ca(OH)_2$ in the absorbing solution discharged from the scrubber, i.e., to adjust the concentration of $Ca(OH)_2$ contained in the absorbing solution supplied to the scrubber to a level equivalent to or less than that of the $SO_2$ contained in the exhaust gas, thereby maintaining the pH value of the absorbing solution from the scrubber, at a level of not more than 7. In this respect, the concentration of $Ca(OH)_2$ to be used may be estimated according to the following equation:

$$C = \frac{S}{22.4} / (L/G) \times 10^{-2} \left[ \frac{g}{100\ cc} \right]$$

wherein
- G: amount of exhaust gas ($Nm^3/hr$)
- S: concentration of $SO_2$ to be absorbed (ppm)
- L: amount of absorbing liquid (l/hr)
- C: concentration of $Ca(OH)_2$ L/G represents a liquid-to-gas ratio ($l/Nm^3$), which is generally governed by the performance of the scrubber.

U.S. Pat. No. 3,959,441 filed by the inventors discloses a flue gas desulfurization process using $Ca(OH)_2$, in which $CaCl_2$ is used for increasing the solubility of $Ca(OH)_2$ and for clearing the absorbing solution. The concentration of $Ca(OH)_2$ in this case ranges from 0.3 to 0.8% by weight.

In contrast thereto, the inventors have not adopted $CaCl_2$ to increase the solubility of $Ca(OH)_2$ for the concentration of $Ca(OH)_2$ remains relatively low and the loss of the alkali is taken into consideration. To our great surprise, however, when $Ca(OH)_2$ is in a low concentration range, there arises an increase in the oxidation rate of calcium sulfite into gypsum due to the lowered pH of the absorbing solution, with the result of the formation of gypsum scale over the inner surfaces of the scrubber and piping. This causes an increase in pressure drop of the gas within the scrubber and lowers the absorption efficiency of $SO_2$ due to a decreased amount of absorbing solution. In addition, continuous stable operation of the apparatus has been interrupted due to clogging of the piping. The study of the inventors reveals that gypsum scale is formed when gypsum produced in the scrubber crystallizes in the form of a solid from a liquid, and then clings to the inner surfaces of the scrubber and piping in the form of crystal nuclei, and then gypsum crystallizes subsequently on the crystal nuclei thus formed, so that gypsum crystals grow and form extremely hard scale.

The formation of gypsum scale is inevitable in the desulfurization treatment according to the lime-gypsum process. For this reason, many solutions to the problem have been proposed, in which gypsum particles serving as seed crystals are placed into the absorbing liquid to allow uniform sprinkling of absorbing liquid over the entire surface of the side walls of the scrubber, or in which the amount of the absorbing solution is increased to stabilize the pH value of the absorbing solution in an attempt to prevent the crystallization of gypsum from a super-saturated state. However, these attempts dictate the use of large amounts of absorbing solution, resulting in an increase in the cost of equipment and operating expenses with economic disadvantage.

SUMMARY OF THE INVENTION

It is an object of the present invention to provide a process for preventing the formation of gypsum scale in a flue gas desulfurization process which is directed to avoiding the aforesaid shortcomings in the prior art, and in which hard scale of gypsum is effectively prevented.

According to the first aspect of the invention, there is provided a process for preventing the formation of gypsum scale, in which, upon the desulfurization treatment of gas containing $SO_2$ according to the lime-gypsum process, with the concentration of $Ca(OH)_2$ in the absorbing solution being not more than 0.1% by weight, $CaCl_2$ is contained in the absorbing solution in amounts of not more than 40% by weight.

According to the second aspect of the present invention, there is provided a process for preventing the formation of gypsum scale according to the first aspect of the invention, in which the concentration of $Ca(OH)_2$ in the absorbing solution ranges from 0.001 to 0.1% by weight.

According to the third aspect of the present invention, there is provided a process for preventing the formation of gypsum scale according to the first aspect of the invention, in which $CaCl_2$ is contained in the absorbing solution in amounts ranging from 1 to 40% by weight, preferably from 5 to 35% by weight.

DESCRIPTION OF THE PREFERRED EMBODIMENTS

The present invention will now be described in more detail with reference to the examples of the invention.

According to the present invention, the concentration of Ca(OH)$_2$ contained in the absorbing solution is not more than 0.1% by weight. In case the concentration of Ca(OH)$_2$ exceeds 0.1%, then unreacted Ca(OH)$_2$ remains in the absorbing solution which is discharged from the scrubber in a conventional flue gas desulfurization plant, so that there is produced little or no gypsum scale. Accordingly, the above case in outside the technical scope of the present invention. In case an absorbing solution is used within the aforesaid range, the prevention of formation of gypsum scale by sprinkling of liquid or stability of the pH value dictates the use of an absorbing solution in great amount, thus leading to lack of economy. Accordingly, for preventing gypsum scales when using an absorbing solution in small amounts, the addition of CaCl$_2$ is mandatory. In general, according to the process of the invention, the concentration of Ca(OH)$_2$ ranges from 0.001 to 0.1% by weight. However, the concentration of Ca(OH)$_2$ may be less than 0.001% by weight in case the concentration of SO$_2$ is relatively low and the performance of the scrubber is satisfactory. As the case may be, the concentration of Ca(OH)$_2$ may be over 0.1% by weight with some success, in case gypsum is produced in the absorbing solution.

The amount of CaCl$_2$ as used in the process of the invention should be no more than 40% by weight, preferably from 1 to 40%, and more preferably from 5 to 35% by weight. In this respect, two aqueous solutions containing CaCl$_2$ and Ca(OH)$_2$ may be prepared separately, and then mixed with each other. Alternatively, Ca(OH)$_2$ in the form of powder may be supplied to a CaCl$_2$ aqueous solution at a time, thereby providing an aqueous solution containing CaCl$_2$ and Ca(OH)$_2$.

The contents of CaCl$_2$ and Ca(OH)$_2$ are suitably selected within the aforesaid range of concentration, commensurate with the concentration of SO$_2$, liquid-to-gas ratio and other operational conditions.

The absorbing solution thus prepared is fed into a scrubber, so as to contact an exhaust gas by means of a gas-liquid-contacting mechanism in the scrubber, for instance spray apparatus or the like, so that SO$_2$ gas in the exhaust gas may be absorbed into the absorbing solution which in turn is delivered to the treatment section such as for a gypsum forming treatment.

In the reaction of an absorbing solution with a gas containing SO$_2$ according to the present invention, the solubility of CaSO$_4$ formed in an absorbing solution is lowered with the addition of CaCl$_2$. For instance, a solubility of CaSO$_4$ is lowered to about 1/100 of the solubility of CaSO$_4$ in water, at a concentration of CaCl$_2$ of 30% by weight. This causes CaSO$_4$ to crystallize in the liquid quickly, and decreases the amount of CaSO$_4$ which is present in the super-saturated condition.

In general, there are several modes of crystallization of gypsum, i.e., gypsum crystallizes in a liquid so as to form new crystals; gypsum crystallizes on crystals which have been formed in a liquid, thereby allowing the growth of crystals; and gypsum is dissolved in a liquid in a super-saturated state and then crystallizes on crystal nuclei on the inner surfaces of piping. Among these cases, the former two cases wherein gypsum is newly formed provide no possibility of the formation of hard scale. What is the problem is the last case wherein gypsum crystallizes on crystal nuclei. Accordingly, a decrease in amount of CaSO$_4$ present in the super-saturated state directly leads to the prevention of formation of hard scale.

In this manner, troubles stemming from the formation of hard scale of gypsum may be eliminated, with the accompanying freedom from clogging in piping and lowered SO$_2$ absorption efficiency.

The following examples are illustrative of the features of the process according to the invention.

EXAMPLE

A gas which contained about 300 ppm of SO$_2$ and about 15% O$_2$ and was discharged from a sintering plant furnace at a temperature of 110° to 120° C. was introduced into a scrubber at a rate of 350,000 Nm$^3$/HR, while an absorbing solution containing about 30% by weight of CaCl$_2$, and 0.02% by weight of Ca(OH)$_2$ was introduced into the scrubber at a liquid-to-gas ratio (L/G) of 3 l/Nm$^3$ for the absorption of SO$_2$. At this time, the pH value of the absorbing solution discharged from the scrubber was 5 to 6.5.

The flue gas desulfurization plant was operated for eight months under the above conditions. The initial SO$_2$-removal efficiency was about 90%, and this value was maintained even after eight months, while the pressure drop of gas in the scrubber was maintained at 80 to 100 mm of water.

Inspection of an open apparatus revealed that there was no scale in the piping, although scale of a thickness of 2 to 5 mm was noted on the inner walls of the scrubber. However, this amount of scale does not hinder the continuous stable operation of the apparatus for a long period of time.

Table 1 shows the results of a desulfurization treatment for an exhaust gas coming out of a sintering plant furnace, in which an absorbing solution according to the present invention is used in the same manner as in the preceding example.

TABLE 1

|  | Case 1 | Case 2 |
|---|---|---|
| Concentration of exhaust gas SO$_2$ (ppm) | 250 | 180 |
| Concentration of O$_2$ contained (%) | 15 | 16 |
| Temperature of exhaust gas (°C.) | 120–130 | 130–140 |
| Flow rate of exhaust gas (Nm$^3$/Hr) | 200,000 | 300,000 |
| Concentration of CaCl$_2$ in absorbing liquid (wt. %) | 30 | 30 |
| Concentration of Ca(OH)$_2$ in absorbing liquid (wt.%) | 0.04 | 0.01 |
| Liquid-to-gas ratio (L/G) (l/Nm$^3$) | 5 | 4 |
| pH of liquid at exit of scrubber | 5.5–6.0 | 4.5–5.0 |
| Operating time | about 10 months | about 11 months |
| SO$_2$ removal efficiency (%) | 90 | 90 |
| Pressure loss in scrubber (mm H$_2$O) | 30–40 | 80–90 |
| Thickness of scales on inner wall of scrubber (mm) | 2–5 | 2–5 |
| Thickness of scales in piping (mm) | 0 | 0 |

In either case 1 or 2, scale clings to the inner wall of the scrubber to a thickness of 2 to 5 mm. In addition, no scale was noted inside the piping. This attains the intended prevention of scale.

On the other hand, a flue gas desulfurization plant was operated for one month using an absorbing solution comprising a Ca(OH)$_2$ aqueous solution containing no CaCl$_2$. The initial SO$_2$ removal efficiency was about 90%, no different from the case of the absorbing solution containing no CaCl$_2$. After one month, the SO$_2$ removal efficiency was lowered to about 80%, while the pressure drop was increased to 200 mm of water.

Inspection of an open apparatus revealed that scale formed on the inner wall of the piping to a thickness of 5 to 10 mm, and on the inner wall of the scrubber to a thickness of about 500 mm, so that the apparatus could no longer be operated.

The comparison of the embodiment of the invention with the above instance proves that there is a marked difference in the gypsum-scale-preventing effect between the example using a $CaCl_2$ solution, and the example using no $CaCl_2$ solution.

As is apparent from the foregoing description of the process according to the present invention, the concentration of $Ca(OH)_2$ is set to a level equivalent to or less than that of the $SO_2$ contained in the exhaust gas, thereby preventing the discharge of unreacted $Ca(OH)_2$. In addition, the addition of $CaCl_2$ reduces the solubility of $CaSO_4$, thereby causing $CaSO_4$ to crystallize immediately in the liquid, while lowering the degree of super-saturation thereof, in order to prevent the formation of $CaSO_4$ scale on the side walls of the scrubber or in piping. As a result, troubles such as a lowered absorption efficiency of $SO_2$ gas within the scrubber and clogging of piping may be solved in a simple manner economically. In addition, the absorbing solution, due to the addition of $CaCl_2$ thereto, has a lower vapor pressure and a higher boiling point, with the result that the temperature of the exhaust gas, when adiabatically cooled, is increased, thereby reducing fuel consumption for after-burning.

In the desulfurization treatment, in general, gas after desulfurization is re-heated to 100° to 140° C. before being discharged into the atmosphere, for the purposes of protecting materials used for stacks and preventing a white smoke. The cost of fuel required for the above reheating amounts to about 30% of the operating cost of the apparatus. As a result, the achievement of a high temperature clean gas according to the present invention greatly contributes to the reduction of the operating cost.

The process according to the present invention provides various advantages in flue gas desulfurization by the lime-gypsum process.

What is claimed as new and intended to be covered by Letters Patent is:

1. In a process for desulfurizing flue gas containing $SO_2$ by the lime-gypsum process wherein said $SO_2$ is absorbed in an aqueous solution of $Ca(OH)_2$ containing $CaCl_2$, the improvement comprising maintaining the concentration of $Ca(OH)_2$ in said absorbing solution at a level between 0.001% and 0.1% by weight and maintaining the concentration of $CaCl_2$ in said absorbing solution at less than 40% by weight, whereby the formation of gypsum scale is prevented.

2. A process for preventing the formation of gypsum scale according to claim 1, wherein $CaCl_2$ is contained in amounts of 1 to 40% by weight.

3. A process for preventing the formation of gypsum scale according to claim 2, wherein $CaCl_2$ is preferably contained in amounts of 5 to 35% by weight.

* * * * *